(12) United States Patent
Kunkel

(10) Patent No.: US 9,990,749 B2
(45) Date of Patent: Jun. 5, 2018

(54) SYSTEMS AND METHODS FOR SYNCHRONIZING SECONDARY DISPLAY DEVICES TO A PRIMARY DISPLAY

(71) Applicant: Dolby Laboratories Licensing Corporation, San Francisco, CA (US)

(72) Inventor: Timo Kunkel, Oakland, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 38 days.

(21) Appl. No.: 14/184,463

(22) Filed: Feb. 19, 2014

(65) Prior Publication Data
US 2014/0232614 A1 Aug. 21, 2014

Related U.S. Application Data

(60) Provisional application No. 61/767,522, filed on Feb. 21, 2013, provisional application No. 61/767,553, filed on Feb. 21, 2013.

(51) Int. Cl.
| | |
|---|---|
| G06T 11/60 | (2006.01) |
| H04N 5/58 | (2006.01) |
| H04N 21/41 | (2011.01) |
| H04N 21/422 | (2011.01) |
| H04N 21/431 | (2011.01) |

(Continued)

(52) U.S. Cl.
CPC ............ *G06T 11/60* (2013.01); *G06K 9/4652* (2013.01); *G06K 9/4661* (2013.01); *G06K 9/52* (2013.01); *G06K 9/6201* (2013.01); *G06T 7/90* (2017.01); *H04N 5/58* (2013.01); *H04N 9/67* (2013.01); *H04N 21/4122* (2013.01); *H04N 21/42202* (2013.01); *H04N 21/4318* (2013.01);

(Continued)

(58) Field of Classification Search
None
See application file for complete search history.

(56) References Cited

U.S. PATENT DOCUMENTS

| | | | |
|---|---|---|---|
| 6,571,255 B1 | 5/2003 | Gonsalves | |
| 6,980,224 B2 | 12/2005 | Wiant, Jr. | |

(Continued)

FOREIGN PATENT DOCUMENTS

| | | |
|---|---|---|
| WO | 2012/012489 | 1/2012 |
| WO | 2012/100117 | 7/2012 |

(Continued)

*Primary Examiner* — Nicholas J Lee
*Assistant Examiner* — Duane N Taylor, Jr.

(57) ABSTRACT

Systems and methods for perceptually synchronizing at least one secondary display that is in a same visual environment as a primary display. The image appearance parameters may be derived from the image/video shown on the primary display can be used to map the appearance of any arbitrary content on a secondary device. To produce a visually pleasing environment for a viewer in the visual environment, systems and methods are herein disclosed for synchronizing the display settings or parameters. The synchronization may be affected by dynamically adjusting the image data rendered upon one of the primary and/or secondary displays. Such dynamic adjustments may be made in accordance with the characteristics of the primary display and/or secondary display. Such adjustments may be made to the dynamic range, color mapping, etc. of the rendering on either display.

28 Claims, 8 Drawing Sheets

(51) Int. Cl.
  *H04N 9/67* (2006.01)
  *G06K 9/46* (2006.01)
  *G06K 9/52* (2006.01)
  *G06K 9/62* (2006.01)
  *G06T 7/90* (2017.01)
  *G06F 3/14* (2006.01)

(52) U.S. Cl.
  CPC ....... *G06F 3/1454* (2013.01); *G09G 2320/08* (2013.01); *G09G 2360/144* (2013.01)

(56) References Cited

U.S. PATENT DOCUMENTS

| | | | |
|---|---|---|---|
| 7,050,109 B2 | 5/2006 | Safadi | |
| 7,064,759 B1 | 6/2006 | Feierbach | |
| 7,184,063 B2 | 2/2007 | Shum | |
| 7,394,565 B2 | 7/2008 | Stokes | |
| 7,894,524 B2 | 2/2011 | Demos | |
| 7,961,784 B2 | 6/2011 | Demos | |
| 8,050,323 B2 | 11/2011 | Demos | |
| 8,091,038 B1 | 1/2012 | Johnson | |
| 8,422,795 B2 | 4/2013 | Pahalawatia | |
| 8,477,851 B2 | 7/2013 | Demos | |
| 8,483,479 B2 | 7/2013 | Kunkel | |
| 8,525,933 B2 | 9/2013 | Atkins | |
| 8,594,188 B2 | 11/2013 | Demos | |
| 8,660,352 B2 | 2/2014 | Gish | |
| 9,035,851 B2 * | 5/2015 | Noma | G09G 5/10 345/1.1 |
| 9,142,012 B2 * | 9/2015 | Lim | G06T 5/20 |
| 2003/0046401 A1 | 3/2003 | Abbott | |
| 2007/0121005 A1 | 5/2007 | Gutta | |
| 2008/0307342 A1 | 12/2008 | Furches | |
| 2009/0086816 A1 | 4/2009 | Leontaris | |
| 2009/0322800 A1 | 12/2009 | Atkins | |
| 2010/0013997 A1 | 1/2010 | Hwang | |
| 2010/0110000 A1 | 5/2010 | De Greef | |
| 2010/0150526 A1 | 6/2010 | Rose | |
| 2010/0231603 A1 | 9/2010 | Kang | |
| 2010/0289810 A1 | 11/2010 | Doser | |
| 2011/0122048 A1 * | 5/2011 | Choi | G06F 3/1446 345/1.1 |
| 2011/0194618 A1 * | 8/2011 | Gish | G06T 5/50 375/240.25 |
| 2011/0242142 A1 * | 10/2011 | Hussain | G06F 3/1446 345/690 |
| 2011/0305391 A1 | 12/2011 | Kunkel | |
| 2012/0038782 A1 | 2/2012 | Messmer | |
| 2012/0074851 A1 | 3/2012 | Erinjippurath | |
| 2012/0075435 A1 | 3/2012 | Hovanky | |
| 2012/0127324 A1 | 5/2012 | Dickins | |
| 2012/0200593 A1 | 8/2012 | Todd | |
| 2012/0229495 A1 | 9/2012 | Longhurst | |
| 2012/0299817 A1 | 11/2012 | Atkins | |
| 2012/0314773 A1 | 12/2012 | Gish | |
| 2012/0314944 A1 | 12/2012 | Ninan | |
| 2012/0315011 A1 | 12/2012 | Messmer | |
| 2012/0320014 A1 | 12/2012 | Longhurst | |
| 2012/0321273 A1 | 12/2012 | Messmer | |
| 2013/0027615 A1 | 1/2013 | Li | |
| 2013/0057567 A1 * | 3/2013 | Frank et al. | 345/589 |
| 2013/0182589 A1 * | 7/2013 | Tolentino | H04B 15/00 370/252 |
| 2014/0125554 A1 * | 5/2014 | Pan | G06T 3/40 345/2.2 |

FOREIGN PATENT DOCUMENTS

| | | |
|---|---|---|
| WO | 2012/166382 | 12/2012 |
| WO | 2012/168479 | 12/2012 |

* cited by examiner

SYSTEMS AND METHODS FOR SYNCHRONIZING SECONDARY DISPLAY DEVICES TO A PRIMARY DISPLAY

CROSS-REFERENCE TO RELATED APPLICATIONS

The application claims benefit of priority to related, U.S. Provisional Patent Application No. 61/767,522 filed on Feb. 21, 2013 entitled "Systems and Methods for Synchronizing Secondary Display Devices to a Primary Display" by Timo Kunkel, and related to co-owned Patent Application No. 61/767,553 entitled "Systems and Methods for Appearance Mapping for Compositing Overlay Graphics" by Timo Kunkel et. al., hereby incorporated by references in its entirety.

TECHNICAL FIELD

The present invention relates to displays systems and, more particularly, to methods and systems for synchronizing two or more display devices.

BACKGROUND

Dynamic range (DR) relates to a span of intensity (e.g., luminance, luma) in an image. The DR in real-world scenes is usually large. Different image and video applications for the capture, representation, and presentation of image and video signals may have different DR. For example, photographic negatives can have a relatively large dynamic range, while photographic prints, some currently existing (e.g., conventional) television (TV) sets, and computer monitors may have a smaller DR.

DR also relates to a capability of the human psychovisual system (HVS) to perceive a range of intensity (e.g., luminance, luma) in an image, e.g., from darkest darks to brightest brights. In this sense, DR relates to a "scene-referred" intensity. DR may also relate to the ability of a display device to adequately or approximately render an intensity range of a particular breadth. In this sense, DR relates to a "display-referred" intensity. In another sense, DR may also refer to a "signal-referred" intensity—which may be to some extent theoretical. For example, a VDR signal may range up to 10,000 nits and HDR signals may range even higher. Most of the time, there are no grading displays for that range. Unless a particular sense is explicitly specified to have particular significance at any point in the description herein, it should be inferred that the term may be used in either sense, e.g. interchangeably.

Rendering by conventional TV sets and computer monitors is often constrained to approximately three orders of magnitude of dynamic range—typifying a low dynamic range (LDR), also referred to as a standard dynamic range (SDR). In contrast to LDR images, high dynamic range (HDR) images contain essentially all of the dynamic range in an original scene. HDR can span some 14-15 orders of magnitude of dynamic range. HDR images can be represented by any bit depth, but typically 10-16 bits or more are used to reduce overly large step sizes.

For a number of applications such as compression for distribution, encoding for HDR images may unnecessary and may in fact be somewhat computationally expensive or bandwidth consumptive. On the other hand, LDR images may simply not suffice either. Instead, such applications may advantageously use, create, store, transmit or render images that may be characterized by a visual dynamic range or variable dynamic range, VDR. VDR images, truncated in relation to HDR, encompass essentially all of the luminance and color that a typical HVS can simultaneously perceive (e.g., visually perceive at any given time). VDR spans about 5-6 orders of magnitude of dynamic range. Thus while narrower in relation to HDR, VDR nonetheless represents a wide DR breadth. Despite the DR differences between HDR and VDR images, the term EDR, as used herein, characterizes any image with an extended dynamic range compared to LDR.

SUMMARY

Several embodiments of display systems and methods of their manufacture and use are herein disclosed.

Systems and methods for perceptually synchronizing at least one secondary display that is in a same visual environment as a primary display. The image appearance parameters may be derived from the image/video shown on the primary display can be used to map the appearance of any arbitrary content on a secondary device. The primary display and the secondary display are rendering image/video data at substantially the same time in the same visual environment. To produce a visually pleasing environment for a viewer in the visual environment, systems and methods are herein disclosed for synchronizing the rendering of their respective image/video data. The synchronization may be affected by dynamically adjusting display settings and/or the image data rendered upon one of the primary and/or secondary displays. Such dynamic adjustments may be made in accordance with the characteristics of the primary display and/or secondary display. Such adjustments may be made to the dynamic range, color mapping, etc. of the rendering on either display. If there are no suitable adjustments to one or the other display's image/video data, then adjustments may be made to the settings of either display or vice versa.

In one embodiment, a system and/or method is disclosed that comprises steps and/or modules for initially determining LCD image values for rendering a target image and then employs such LCD image values to determine a backlight for the target image.

In one embodiment, a method for synchronizing a secondary display with a primary display is disclosed wherein the secondary display and the primary display within a same visual environment and such that the secondary display is rendering image/video data at substantially the same time as the primary display; the steps of the method comprising: establishing communications with said primary display; establishing communications with said secondary display; inputting metadata from said primary display and said secondary display, said metadata associated with said primary display and said secondary display characteristics respectively; and dynamically calculating an adjustment of rendering said image/video data upon one of a group, said group comprising said primary display and said secondary display.

In another embodiment, a system for synchronizing a secondary display with a primary display is disclosed wherein the secondary display and the primary display are within a same visual environment and such that the secondary display is rendering image/video data at substantially the same time as the primary display; said system comprising: a display management module, said display management module capable of accepting image data to be rendered upon said primary display and capable of accepting image data to be rendered upon said secondary display; and wherein further said display management module is capable of dynamically calculating an adjustment of rendering said image data upon one of a group, said group comprising said primary display and said secondary display.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In a typical viewing environment (whether in a home, office or theater), there may be one primary device (for example, a projector in a theater, a large panel television or home projector in the home or office, an outdoor video-wall or the like) displaying video content—while, at the same time, there may be secondary devices displaying the same or similar content on their screens. The presence of one or more secondary displays displaying the same or similar content tends to alter the ambient light condition in that environment—perhaps so much so, as to lessen the visual experience for any and all such viewers within that environment.

Figure 1:
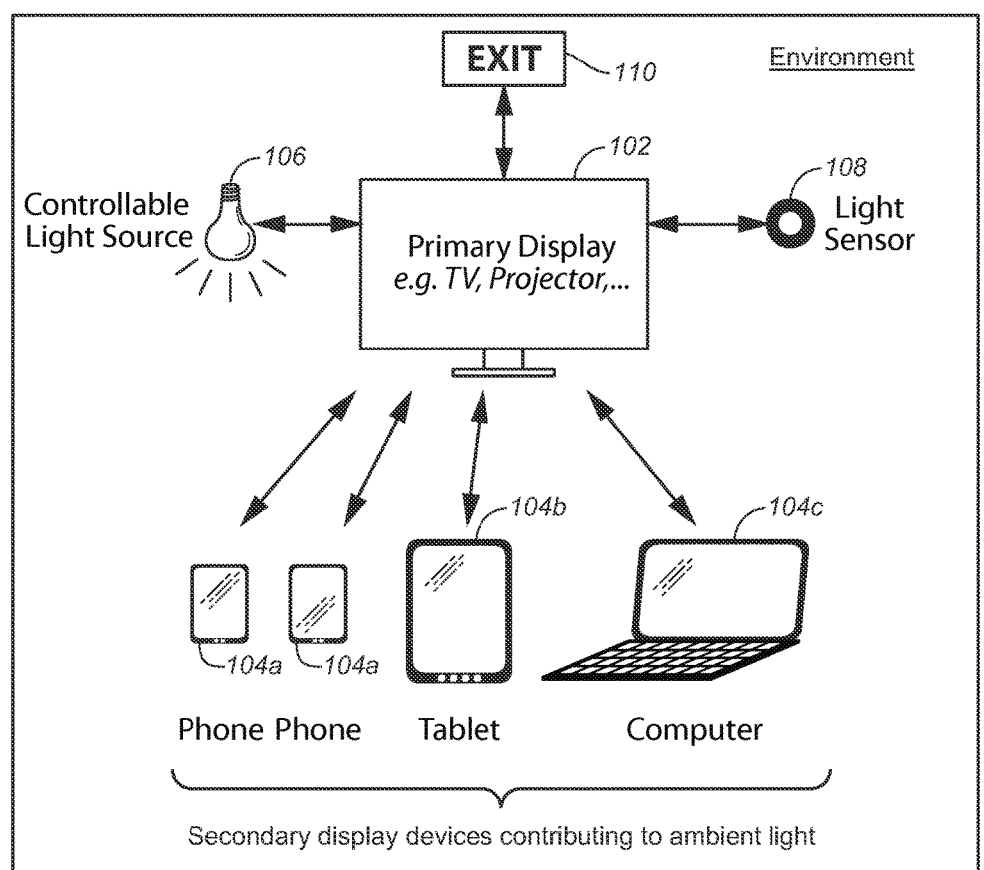
FIG. 1. shows one exemplary environment in which one embodiment of the present application may operate.

FIG. 1 depicts one possible environment in which systems and/or methods of the present application may reside and/or operate. Environment 100 may be a large space (e.g., a theater)—or a smaller space (e.g., an office, conference room, living room, bedroom or some other room or office). With this environment, primary display 102 may be displaying an image or a video stream and emitting light into the environment. Primary display 102 may be any one of a number of possible displays and/or display technologies—e.g., projector, television, flat panel display, and the like). Primary display may have (i.e. internal), or being in communications with (i.e., external) light sensor 108. Light sensor 108 may provide sensor data regarding the ambient light conditions for the primary display (e.g., incident light, light reflected off walls, scattered and/or reflected from the display panel, etc.). Such sensor data may allow the primary display to alter playback characteristics (e.g., luminance, white point, dynamic range, color gamut) in order to provide a pleasing visual experience for a viewer—e.g., according to video processing algorithms as are known in the art. In addition, there may be lighting (e.g., general or specific) 106 within the environment that may have some controllable aspects to it. For example, general lighting may be controllable via some wireless or wired control signals—e.g., to change the luminance, white point or color of the lighting during an image/video playback. Other lighting (e.g., signs 110) may also be in the environment and may be taken into consideration as ambient conditions.

In environment 100, there may be one or more secondary displays (e.g., smart phones 104a, tablet 104b, laptop 104c or the like). In certain circumstances, it may be desirable for at least one secondary display to be showing the same or similar image and/or video content that is substantially concurrently being displayed by the primary display. For merely one example (and not meaning to limit the scope of the present application), it may be desirable to have the secondary displays showing all or portions of the image/video data—and possibly, allowing an interactive feature to be present on the secondary display. For example, owners of such secondary display may have their own subtitles, may make or have their own annotations to the image/video content, or any other scenario in which it may be desirable for primary and secondary displays showing same or similar content. Other uses may be desirable. For example, while watching a sports game, consumers check score tables on their tablet. Or, viewers may watch a movie while checking background information on movie database websites such as IMDB.

Thus, it may be desirable to have some rendering/appearance metadata connection and/or synchronization between the primary display (e.g. the main TV or projector) and the secondary display. To achieve such synchronization, it may be desirable to control several image/video characteristics. For one example, the minimum and maximum luminance levels—as well as the white point—may differ substantially between the primary device and the secondary device(s). The effects of the lack of synchronization may be (in the simplest case) reduced fidelity when switching gaze between the displays—but may also lead to serious visual discomfort and eye-strain, if factors such as the brightness levels are extremely different.

In one embodiment, it may be desirable to adjust/synchronize parameters that are mostly spatially and temporally global. For examples, the following may be so adjusted/synchronized: the primary and secondary display's min/max luminance, contrast, gamut, text/close captioning size and luminance/contrast. Further, the metadata link may also be used with more local changes. For merely one example, when the (movie-) scene on the primary display switches from bright daylight to a night scene, the luminance mapping of the tablet can also be adjusted avoiding extreme luminance jumps when switching gaze from primary to secondary display.

Other aspects may also be part of the adjustment process—e.g., the viewer's distance may be identified and adjusted in case the viewer changes his/her position relative to the primary display. This may be used to adjust the size and luminance of text, illustration and/or close captioning.

Several Synchronization Embodiments

Figure 2:
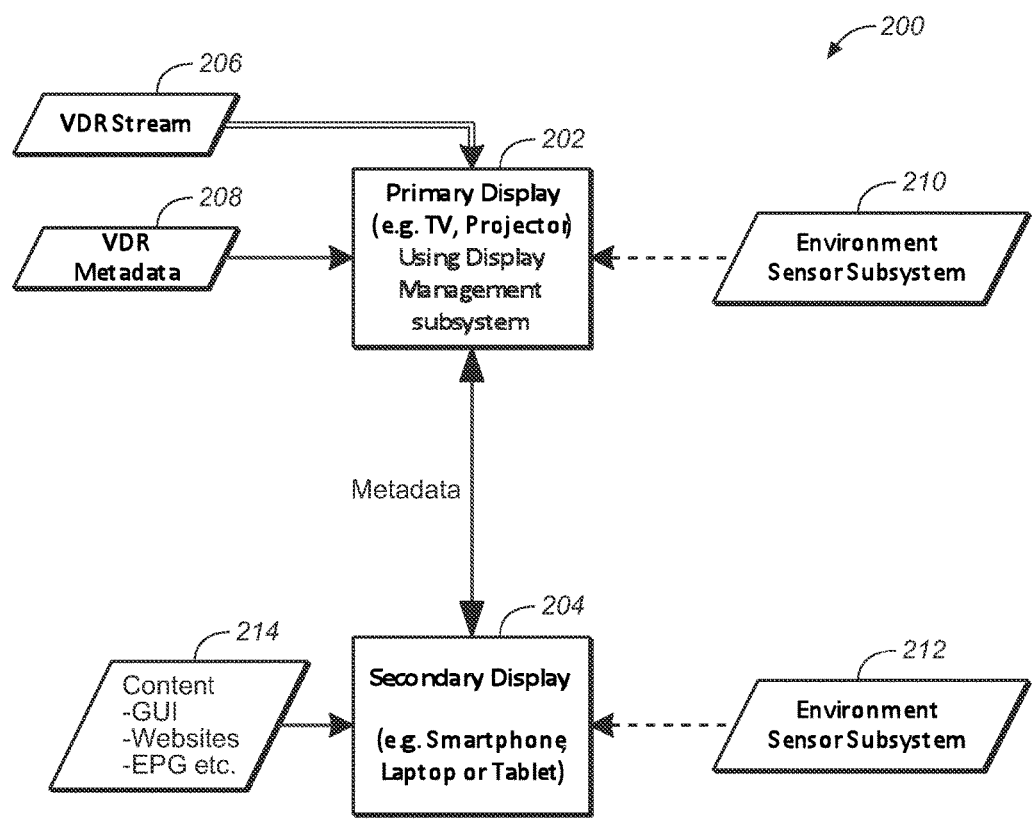
FIG. 2 shows one embodiment of a synchronization system and/or process whereby the VDR data stream is shared by the primary display with at least one secondary display.

FIG. 2 is one embodiment of a system and/or process (200) that synchronizing at least one secondary display (204) to a primary display (202) whereby the primary display shares image appearance parameters or, in some cases, a video stream with the secondary display. It may be seen that either primary display 202 and/or secondary display(s) 204 may have an optional environmental sensor subsystem 210, 212 respectively—for, e.g., detecting ambient light conditions.

In one embodiment, the video stream may be a HDR, EDR and/or VDR data/metadata stream and, as such, some portion of the video processing system may affect HDR, EDR and/or VDR image/video processing. For example, in many embodiments, the information transmitted may be image appearance parameters such as minimum, maximum, mean and reflective white luminance levels—as well as the white-point or data such as image histograms.

Various systems, techniques and/or technologies involving HDR, EDR and VDR data and metadata processing may be found in the following co-owned patent applications:

(1) United States Patent Application 20130027615 to Li, published Jan. 31, 2013 and entitled "QUALITY ASSESSMENT OF HIGH DYNAMIC RANGE, VISUAL DYNAMIC RANGE AND WIDE COLOR GAMUT IMAGE AND VIDEO";

(2) United States Patent Application 20130004074 to Gish, published on Jan. 3, 2013 and entitled "QUALITY ASSESSMENT OF IMAGES WITH EXTENDED DYNAMIC RANGE";

(3) United States Patent Application 20120321273 to Messmer, published on Dec. 20, 2012 and entitled "VIDEO DISPLAY CONTROL USING EMBEDDED METADATA";

(4) United States Patent Application 20120315011 to Messmer et al., published on Dec. 13, 2012 and entitled "VIDEO DELIVERY AND CONTROL BY OVERWRITING VIDEO DATA";

(5) United States Patent Application 20120314944 to Ninan et al., published on Dec. 13, 2012 and entitled "HIGH DYNAMIC RANGE, BACKWARDS-COMPATIBLE, DIGITAL CINEMA";

(6) United States Patent Application 20120314773 to Gish et al., published on Dec. 13, 2012 and entitled "DRIFT-FREE, BACKWARDS COMPATIBLE, LAYERED VDR CODING";

(7) United States Patent Application 20120299817 to Atkins et al., published on Nov. 29, 2012 and entitled "SYSTEMS AND METHODS OF IMAGE PROCESSING THAT ADJUST FOR VIEWER POSITION, SCREEN SIZE AND VIEWING DISTANCE";

(8) United States Patent Application 20120229495 to Longhurst, published on Sep. 13, 2012 and entitled "INTERPOLATION OF COLOR GAMUT FOR DISPLAY ON TARGET DISPLAY";

(9) United States Patent Application 20120038782 to Messmer et al., published on Feb. 16, 2012 and entitled "VDR METADATA TIMESTAMP TO ENHANCE DATA COHERENCY AND POTENTIAL OF METADATA";

(10) United States Patent Application 20090322800 to Atkins, published on Dec. 31, 2009 and entitled "METHOD AND APPARATUS IN VARIOUS EMBODIMENTS FOR HDR IMPLEMENTATION IN DISPLAY DEVICES";

(11) United States Patent Application 20130004074 to Gish, published on Jan. 3, 2013 and entitled "QUALITY ASSESSMENT OF IMAGES WITH EXTENDED DYNAMIC RANGE";

(12) United States Patent Application 20100118957 to Demos, published on May 13, 2010 and entitled "VIDEO IMAGE COMPRESSION USING UNEQUAL WEIGHTS";

(13) United States Patent Application 20100014587 to Demos, published on Jan. 21, 2010 and entitled "INTERPOLATION OF VIDEO COMPRESSION FRAMES";

(14) United States Patent Application 20080273809 to Demos, published on Nov. 6, 2008 and entitled "METHOD AND SYSTEM FOR IMPROVING COMPRESSED IMAGE CHROMA INFORMATION";

(15) United States Patent Application 20070268967 to Demos, published on Nov. 22, 2007 and entitled "INTERPOLATION OF VIDEO COMPRESSION FRAMES";

(16) United States Patent Application 20110103470 to Demos et al., published on May 5, 2011 and entitled "HIGH PRECISION ENCODING AND DECODING OF VIDEO IMAGES"

all of which are herein incorporated by reference in their entirety.

As part of the image/video processing system, primary display 202 (e.g., a projector, TV, flat panel screen or the like) may further comprise a Display Management (DM) subsystem. DM systems typically comprise a processor, computer readable storage and a set of computer readable instructions that are suitable to affect a wide array of image processing algorithms and techniques—e.g., luminance mapping, color gamut mapping, dynamic range mapping.

DM systems are further described in the following co-owned US patent applications:

(1) United States Patent Application 20120321273 to Messmer, published on Dec. 20, 2012 and entitled "VIDEO DISPLAY CONTROL USING EMBEDDED METADATA";

(2) United States Patent Application 20120315011 to Messmer et al., published on Dec. 13, 2012 and entitled "VIDEO DELIVERY AND CONTROL BY OVERWRITING VIDEO DATA";

(3) United States Patent Application 20120229495 to Longhurst, published on Sep. 13, 2012 and entitled "INTERPOLATION OF COLOR GAMUT FOR DISPLAY ON TARGET DISPLAY";

(4) United States Patent Application 20120200593 to Todd et al., published on Aug. 9, 2012 and entitled "RESOLUTION MANAGEMENT FOR MULTI-VIEW DISPLAY TECHNOLOGIES";

(5) United States Patent Application 20120127324 Dickens et al., published on May 24, 2012 and entitled "METHOD AND SYSTEM FOR DISPLAY CHARACTERIZATION OR CALIBRATION USING A CAMERA DEVICE";

(6) United States Patent Application 20120075435 to Hovanky et al., published on Mar. 29, 2012 and entitled "METHOD AND SYSTEM FOR 3D DISPLAY CALIBRATION WITH FEEDBACK DETERMINED BY A CAMERA DEVICE";

(7) United States Patent Application 20120074851 to Erinjippurath, published on Mar. 29, 2012 and entitled "METHOD AND SYSTEM FOR DISPLAY CALIBRATION WITH FEEDBACK DETERMINED BY A CAMERA DEVICE";

(8) United States Patent Application 20110311147 to Pahalawatta et al., published on Dec. 22, 2011 and entitled "QUALITY EVALUATION OF SEQUENCES OF IMAGES";

(9) United States Patent Application 20110194618 to Gish et al., published on Aug. 11, 2011 and entitled "COMPATIBLE COMPRESSION OF HIGH DYNAMIC RANGE, VISUAL DYNAMIC RANGE, AND WIDE COLOR GAMUT VIDEO";

(10) United States Patent Application 20090086816 to Leontaris et al., published on Apr. 2, 2009 and entitled "VIDEO COMPRESSION AND TRANSMISSION TECHNIQUES"

all of which are hereby incorporated by reference in their entirety.

In further reference to FIG. 2, primary display 202 may receive VDR data stream 206 and/or VDR metadata stream 208—such streams representing the image and/or video data (as well as its associated metadata) that is intended to be rendered upon primary display 202. VDR data may represent image data that has an encoding that exceeds (or in some fashion, does not match) the specification of the primary display or the secondary displays. In such a case, the VDR data may be mapped by the DM subsystem for rendering on either the primary display 202 or on at least one (or more) secondary display(s).

As long as secondary display 204 is within the environment of the primary display 202, it is possible for the primary display and the secondary display(s) to be in communications with each other. Any suitable communications means or techniques may suffice—e.g., wireless (Bluetooth, NFC, WiFi, IP or the like) or wired communications. Communication between the primary display and the secondary display(s) may be either unidirectional (e.g., a broadcast protocol) or bidirectional. In one embodiment, the bi-directional connection may also be used if the viewer wants to switch the display of the VDR video stream from primary to secondary display or vice versa. In this way, the appearance of the video stream may be maintained as close as possible.

In one embodiment, it may suffice that the primary display (or the DM subsystem) is aware of the presence of secondary display(s) and have some knowledge of the capabilities and/or specifications of the secondary display(s)—e.g., white point, dynamic range, color gamut, min/max luminance or the like. In addition, other metadata may also be communicated—e.g., distance from primary display. Secondary display(s) 204 may receive metadata (or even VDR stream data) from primary display 202 (or perhaps a set top box, data router or the like in the environment). Secondary display 204 may also receive other content 214 from its GUI, EPG, or websites that it may be in communications with over—e.g., the internet.

Figure 3:
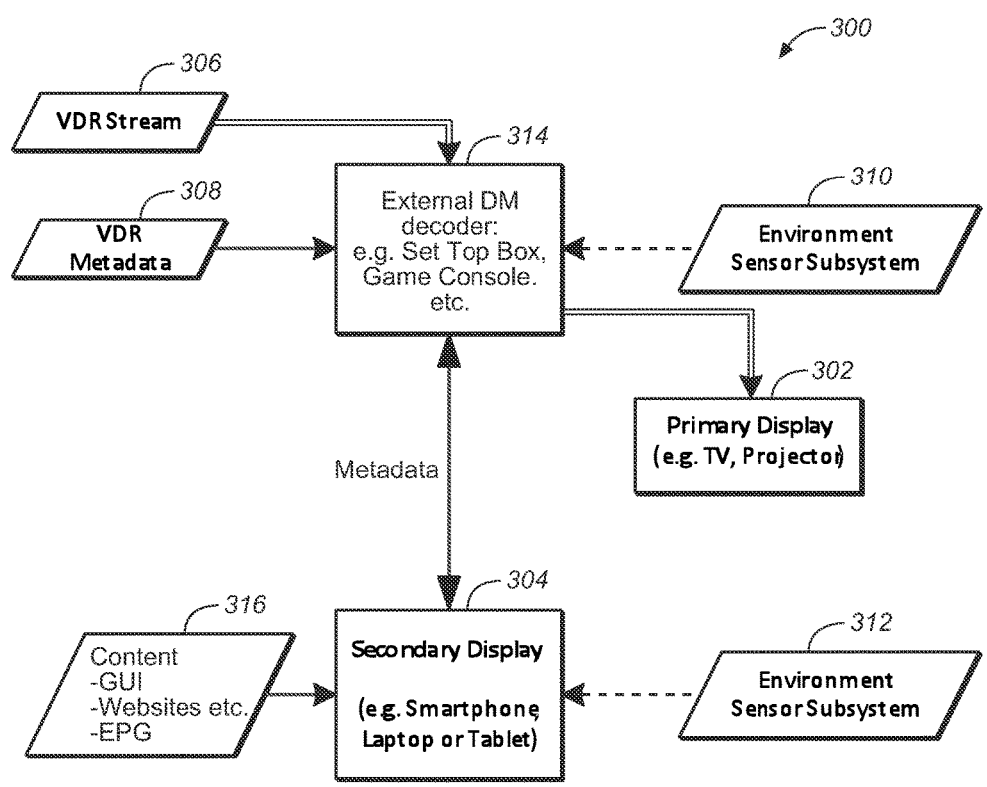
FIG. 3 shows one embodiment of a synchronization system and/or process whereby the VDR data stream is shared by a set top box with both the primary display and at least one secondary display.

FIG. 3 shows another embodiment of a synchronization system and/or process whereby the VDR data stream is shared by a set top box with both the primary display and at least one secondary display.

In this embodiment, VDR data stream 306 and/or VDR metadata 308 may be input into a separate and/or external DM decoder 314 (e.g., perhaps a set top box, game console, computer, audio-video receiver (AVR), video processor, BluRay player or the like). In this case, DM decoder 314 may have some knowledge regarding the capabilities or specifications of both the primary display 302 and the secondary display(s) 304. DM decoder may also establish communications between itself and primary display 302 and secondary display(s) 304 to stream such data and/or metadata to substantially maintain synchronization/proper adjustment between the primary display and the secondary display(s). As above, secondary display(s) 304 may receive metadata (or even VDR stream data) from set top box 314 (or perhaps primary display, data router or the like in the environment). Secondary display 304 may also receive other content 316 from its GUI, EPG, or websites that it may be in communications with over e.g., the internet.

As with the other embodiment, there may be optional environmental sensors and/or subsystems (e.g., 310, 312) that feedback data regarding the visual aspects of the environment—e.g., possibly to aid in proper synchronization.

Figure 4:
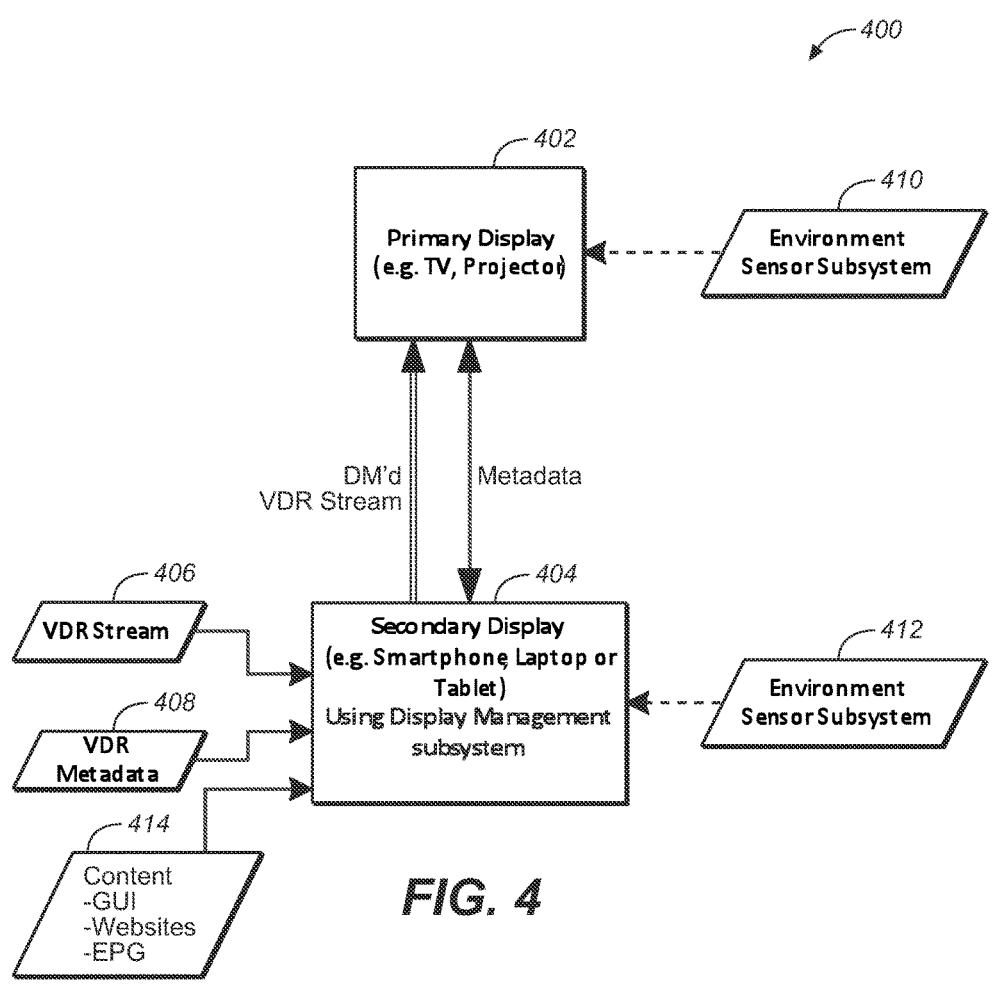
FIG. 4 shows one embodiment of one embodiment of a synchronization system and/or process whereby the VDR data stream is shared by at least one secondary display with the primary display.

FIG. 4 shows yet another embodiment of one embodiment of a synchronization system and/or process whereby the VDR data stream is shared by at least one secondary display with the primary display.

In this embodiment, VDR data stream 406 and/or VDR metadata stream 408 may be input into at least one secondary display 404. Secondary display 404 may further comprise a DM subsystem for the further processing of image/video data and/or metadata. Such data and/or metadata may be shared with a primary display 402 after suitable communications have been established with the primary display. It should be noted that the secondary device receiving the VDR stream solely may serve as decoder which followed by a DM subsystem. The DM'd content may then be send to the primary display (e.g. wired or wirelessly) without displaying it on the decoding secondary device. The DM subsystem may have some knowledge regarding the capabilities or specifications of both the primary display 402. As with the other embodiment, there may be optional environmental sensors and/or subsystems (e.g., 410, 412) that feedback data regarding the visual aspects of the environment—e.g., possibly to aid in proper synchronization. Secondary display(s) 404 may receive other content 414 from its GUI, EPG, or websites that it may be in communications with over—e.g., the internet.

In other embodiments, it may be possible that an environment comprise multiple primary displays. Each of those primary displays may run their own DM and thus may reproduce the source as close to the original as possible. In such a case, it may be also possible to use a similar metadata stream as with the secondary displays to appearance-synchronize multiple primary displays together.

One Processing Embodiment

Figure 5:
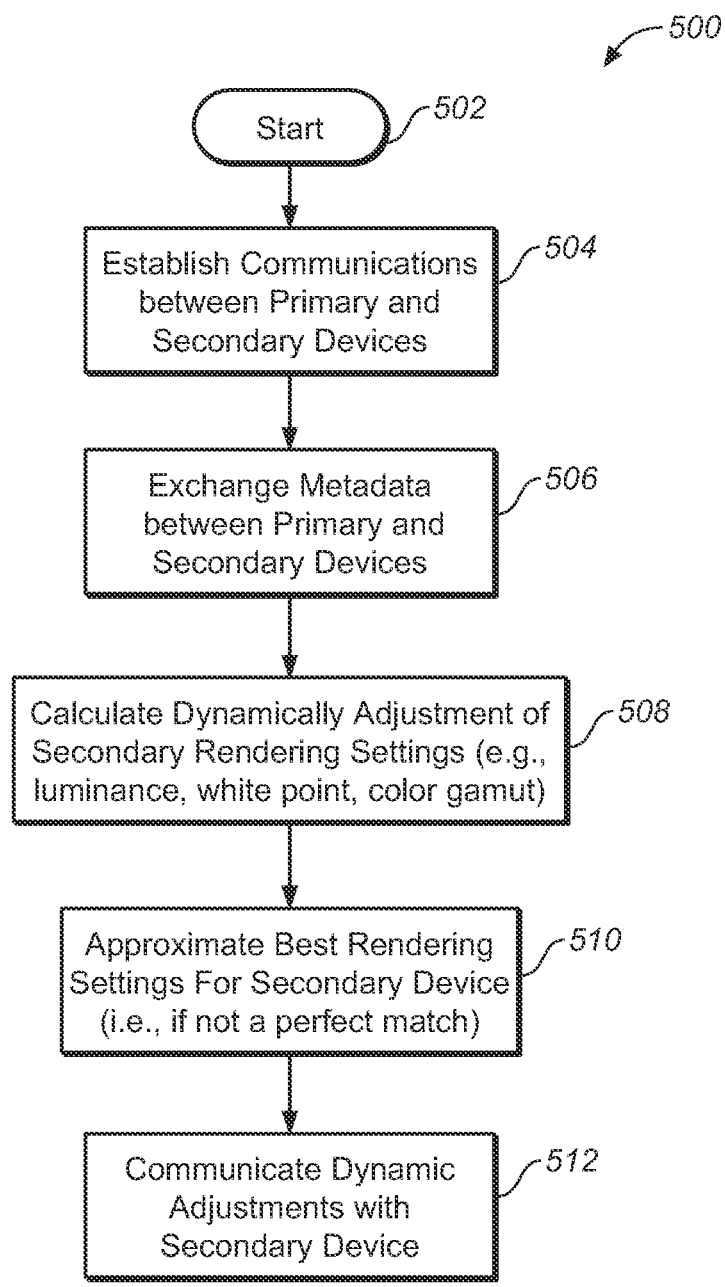
FIG. 5 is one embodiment of a process flowchart as made in accordance with the principles of the present application.

As with the various embodiments disclosed above that may encompass a number of possible configurations for synchronization, each may affect a processing module and/or routine to implement a suitable synchronization FIG. 5 is one embodiment of such a processing module and/or routine. Such a processing module/routine (500) may reside within the DM processor—or, alternatively, any place where there is suitable processor and computer readable storage.

Starting at 502, processing module/routine may establish suitable communications between a primary display and secondary display(s) at 504. Such communication may be with each primary and secondary displays separately, as desired—especially e.g., if the processing module/routine is remote to both primary and secondary displays. As previously mentioned, such communications may be one-way, bi-directional—and it may be affected by any known means or method of communication (e.g., wireless or wired). At 506, display capabilities, characteristics and/or other metadata (e.g., environmental sensor data) may be exchanged between (or otherwise, input to an external processing module/routine separately) the primary display and secondary display(s). This may happen substantially continuously during the time of viewing image/video data and the synchronization. In the case, where an external DM subsystem is affecting the synchronization then the communications and exchange would proceed accordingly.

At 508, processing module/routine may calculate the adjustment of secondary display(s) settings, according to both the image/video data desired to be rendered—as well as according to the secondary display(s) capability and specification. For example, secondary display(s) may have unique min/max luminance, dynamic range, white point, color gamut settings and capabilities that may be subject to such dynamic adjustment. In another embodiment, step 508 may proceed whereby the processing module/routine calculates and/or dynamically adjusts the settings of the primary display—either alone or with secondary display(s). In yet another embodiment, the processing module/routine may calculate an adjustment of image data values to be rendered upon either the secondary display and/or the primary display. This adjustment may be made according to the primary display's characteristics, the secondary display's characteristics and/or the image/video data characteristics to be rendered. In any of these embodiments, the processing module/routine may dynamically calculate an adjustment to the rendering of the image/video data upon the secondary display, the primary display or both. This adjustment may tend to achieve a visually pleasing effect for the viewer.

At 510, if the calculation in step 508 is not a good fit for rendering and/or does not yield an adjustment that is within the capabilities of the display in question, then processing module/routine at 512 may approximate a best (or at least good) rendering for the display in question. This may mean approximating good fits to luminance, dynamic range, color gamut, color appearance and the like, using various techniques, possibly according to some desired metrics of good fit. Some such methods and/or techniques for modifying display setting (e.g., dynamic range and implementing color appearance models) are further disclosed in co-owned U.S. patent applications:

(1) United States Patent Application 20120051635 to Kunkel et al., published on Mar. 1, 2012 and entitled "LIGHT DETECTION, COLOR APPEARANCE MODELS, AND MODIFYING DYNAMIC RANGE FOR IMAGE DISPLAY";

(2) United States Patent Application 20110305391 to Kunkel et al., published on Dec. 15, 2011 and entitled "IMAGE PROCESSING AND DISPLAYING METHODS FOR DEVICES THAT IMPLEMENT COLOR APPEARANCE MODELS";

(3) United States Patent Application 20120320014 to Longhurst et al., published on Dec. 20, 2012 and entitled "SYSTEM AND METHOD FOR ADJUSTING DISPLAY BASED ON DETECTED ENVIRONMENT";

(4) United States Patent Application 20120026405 to Atkins et al., published on Feb. 2, 2012 and entitled "SYSTEM AND METHOD OF CREATING OR APPROVING MULTIPLE VIDEO STREAMS";

(5) United States Patent Application Number 20100231603 to Kang, published Sep. 16, 2010 and entitled "ARTIFACT MITIGATION METHOD AND APPARATUS FOR IMAGES GENERATED USING THREE DIMENSIONAL COLOR SYNTHESIS" all of which are incorporated by reference in their entirety.

Once such adjustments are calculates and/or approximated, then the adjustments may be communicated with the desired display(s) at 512.

Examples of Display Adjustments

Figure 6:
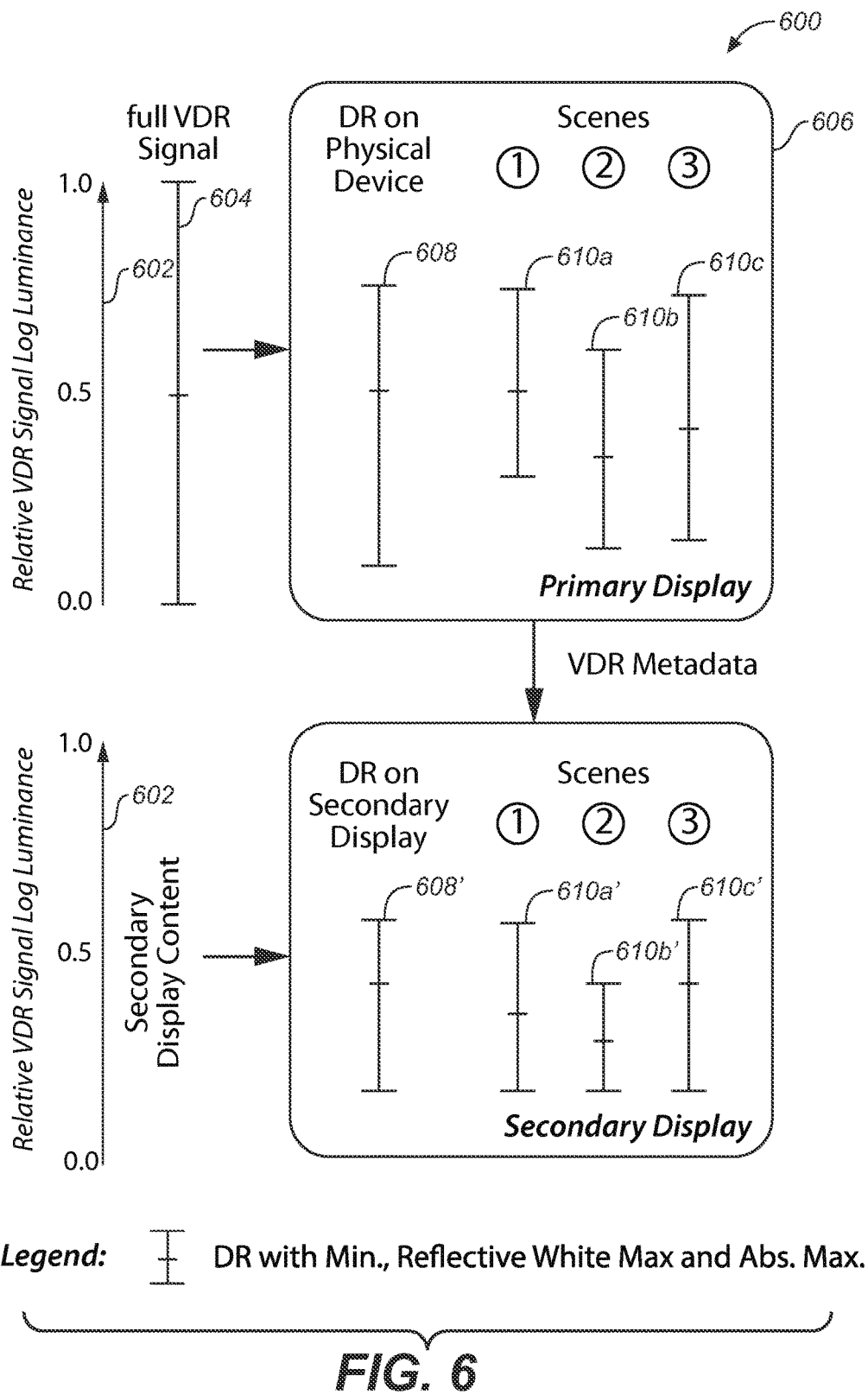
FIG. 6 depicts one exemplary embodiment of the synchronization of at least one secondary device with a primary device with respect to dynamic range, minimum luminance, reflective white point and absolute maximum.

FIG. 6 depicts one exemplary embodiment of the synchronization of at least one secondary device with a primary device with respect to dynamic range, minimum luminance, reflective white point and absolute maximum. All dynamic range bars shown in FIG. 6 are related to the reference dynamic range shown in 602. Each dynamic range bar is illustrated as ranging from a minimum to a maximum luminance. The middle intersection line within a dynamic range bar references a luminance value representing reflective white.

FIG. 6 illustrates how scene-by-scene dynamic ranges are mapped on a primary display (606) and how this mapping is related to the secondary display(s). The input VDR signal (604) may potentially be mapped to the maximum dynamic range (608) of the primary physical display device. However, based on the actual dynamic range present in the input VDR scene, the display management (DM) module may allocate different dynamic range intervals to each scene on the primary displays, illustrated by Scene 1, 2 and 3 (610*a*, 610*b* and 610*c*, respectively).

Similarly, a secondary display may have a total physical dynamic range (608'), which can be (and in most cases is) different to the dynamic range of the primary display (608). Therefore, the secondary display device may not allocate the same dynamic range to any displayed content (e.g. GUI, websites, etc.) as is available to the mapped VDR stream on the primary screen. Instead, the display management module may provide dynamic range suggestions—reflecting the appearance of 610*a*, 610*b* and 610*c* on the primary display—adjusted to the capabilities of the particular secondary display 608' resulting in dynamic ranges illustrated by 610*a'*, 610*b'* and 610*c'*, respectively. These suggestions differ amongst different secondary displays (e.g. for 104*a, b* or *c*).

It should be noted that the requested dynamic range of the actual content on the secondary displays (e.g. GUI, websites, etc.) may not have to use the full dynamic range suggest by the display management system. But if it stays in this range, they will tend to be a perceptual match in dynamic range and lightness as close as possible to the primary display.

Figure 7A:
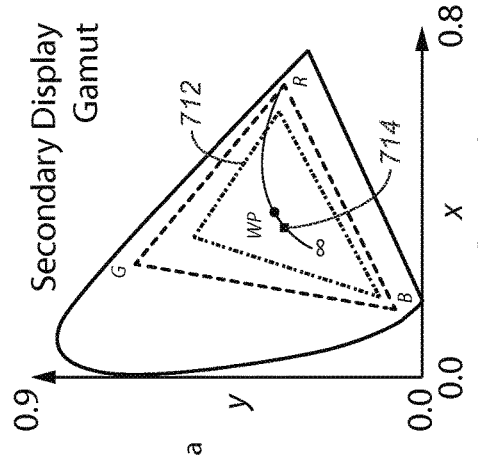
FIGS. 7A, 7B, 7C and 7D depict one exemplary embodiment of the synchronization of at least one secondary device with a primary device with respect to color gamut.
Figure 7B:
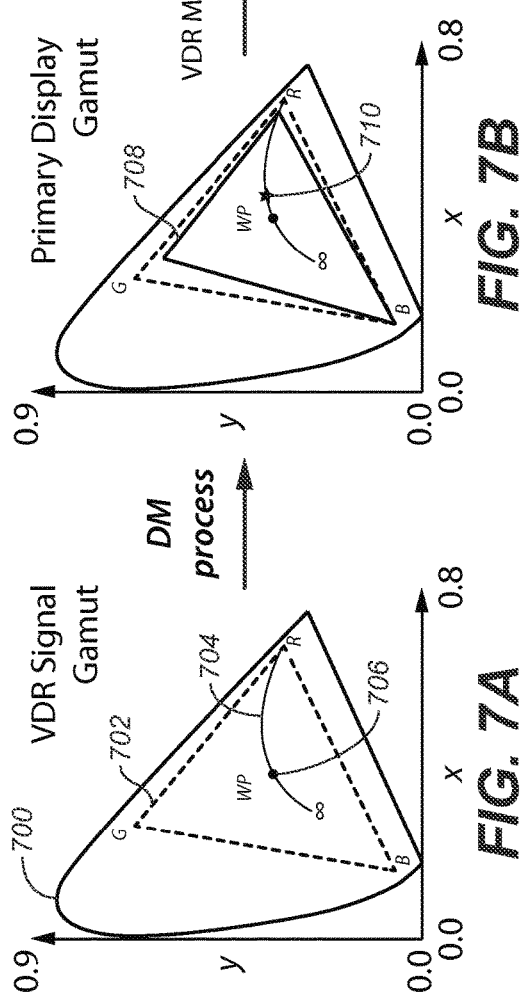
Figure 7C:
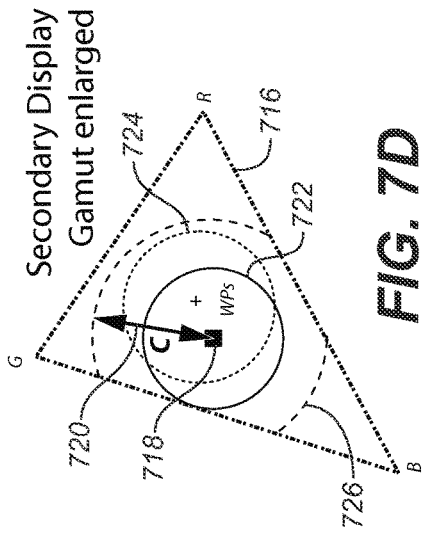
Figure 7D:
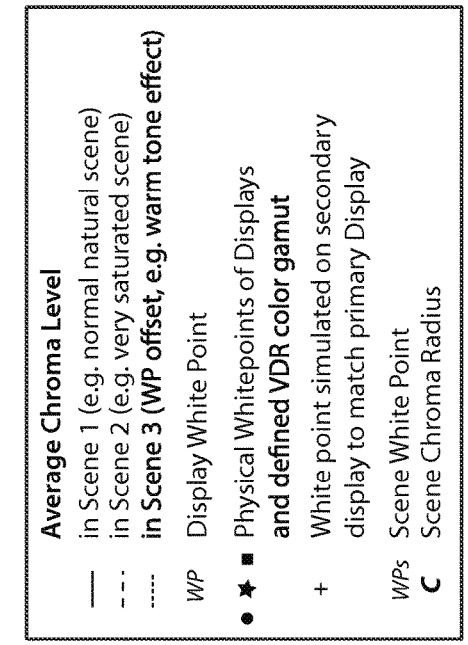

FIGS. 7A, 7B, 7C and 7D depict one exemplary embodiment of the synchronization of at least one secondary device with a primary device with respect to color gamut. FIGS. 7A-7D illustrate how scene-by-scene gamut and white-points may be mapped on a primary display and how this mapping may be related to content on the secondary displays. Each FIG. 7A to FIG. 7C shows a chromaticity diagram (700) with a color gamut triangle (702, 708, 712, respectively), white-point (706, 710, 714 respectively) as well as black body curve (704). The input VDR gamut (702) and white-point (706) may potentially be mapped to the gamut (708) and white-point (710) of the primary physical display device (706). However, based on the gamut and white-point present in the input VDR scene, the display management (DM) module may allocate a different gamut size and white-point to each scene on the primary displays.

Further, the subset of the gamut used by each particular scene may also be represented by a Chroma (or colorfulness or saturation) value C (720) which usually (but not necessarily) has its origin in the white-point (718). The Gamut size/Chroma value as well as the white-point may be arbitrarily defined by the scene and the DM as long as it stays inside the physical gamut of the primary display device (716).

Similarly, a secondary display (FIG. 7C) may have a physical gamut (712) and white-point (714), which can be (and in most cases is) different to the gamut size/Chroma range of the primary display (FIG. 7B). Therefore, the secondary display device may not allocate the same gamut/Chroma extent and white-point to any displayed content (e.g. GUI, websites, etc.) as is available to the mapped VDR stream on the primary screen. Instead, the display management module provides dynamic gamut/Chroma and white-point suggestions for scenes 1, 2 and 3 (722, 724 and 726, respectively) reflecting the appearance of those scenes on the primary display, adjusted to the capabilities of the particular secondary display (color gamut 716, physical white-point 718) resulting in Chroma ranges illustrated by 722, 724 and 726. These suggestions may differ amongst secondary displays (e.g. for 104*a*, *b* or *c*).

It may be noted that the requested gamut/Chroma range of the actual content on the secondary displays (e.g. GUI, websites, etc.) may not have to use the full gamut/Chroma range suggested by the display management system. But if it stays in this gamut/Chroma range, there will be a perceptual match in dynamic range and lightness as close as possible to the primary display.

Deployment to Legacy Devices

In one embodiment, it may be possible to distribute the processing module/routine to existing tablets, computers (desktop, laptop, netbook, etc.), color profiles such as the widespread ICC standard can be generated. In one embodiment, a user has to do is to install a suitable software driver that manages the communication between the DM and the color management system (CMS) of the secondary device (e.g. laptop).

The DM module may receive information about the capabilities of a particular secondary device's display's capabilities. It then may merge that information with the requirements for the current VDR scene and builds a color profile (e.g. ICC profile). This profile gets transmitted to the display profile driver on the secondary device, which is able to apply the particular profile to the operating system and/or display driver.

Figure 8:
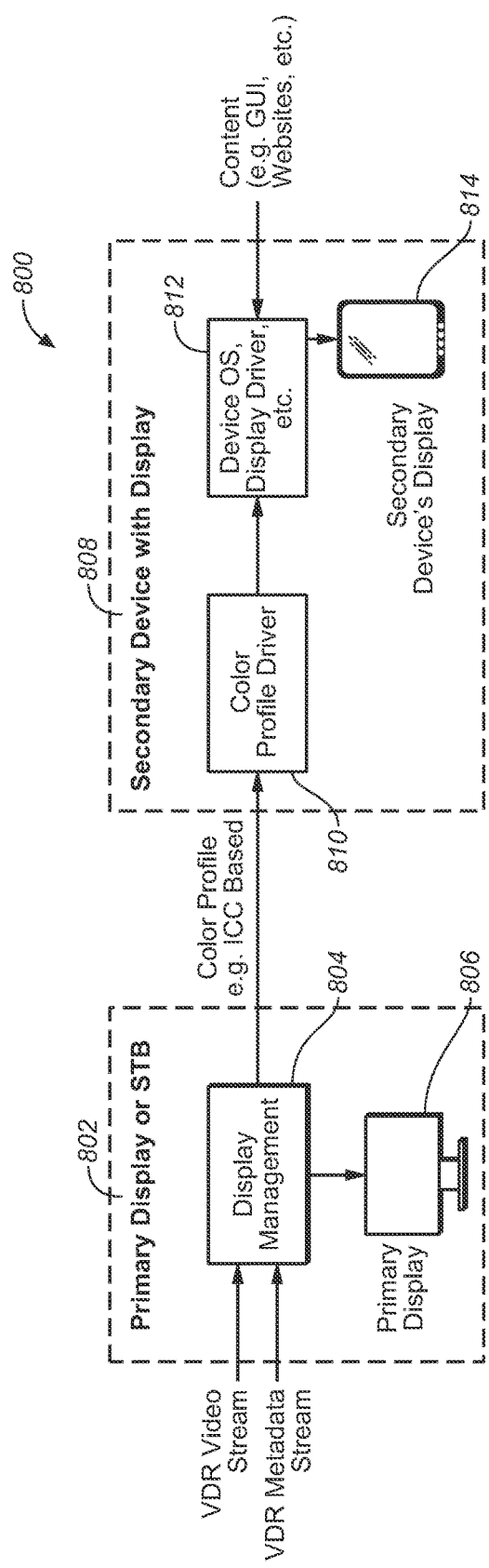
FIG. 8 shows one exemplary embodiment of synchronization techniques in combination with legacy devices.

FIG. 8 is an illustration of an environment (800) where such a system might operate. Primary device (or a set top box) 802 may receive a VDR data and/or metadata stream into a DM module 804. DM module may send suitable video signals to Primary Display 806—as well as send metadata and/or video signals and color profiles (e.g., ICC based) to a color profile driver 810 at the secondary display device 808

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for perceptually synchronizing a secondary display with a primary display, said secondary display and said primary display within a same visual environment and such that said secondary display rendering image data at substantially the same time as said primary display, the steps of said method comprising: establishing communications with said primary display, said primary display including a processor operative to adjust luminance settings of said primary display and to render image data on said primary display; establishing communications with said secondary display, said secondary display including a processor operative to adjust luminance settings of said secondary display and to render image data on said secondary display; receiving metadata from said primary display and said secondary display, said metadata identifying one or more capabilities of said primary display and identifying one or more capabilities of said secondary display, respectively; dynamically calculating an adjustment of luminance settings for at least one of said primary display and said secondary display based on at least one of said capabilities of said primary display and said capabilities of said secondary display indicated by said metadata; providing said adjustment of luminance settings calculated for said at least one of said primary display and said secondary display to said processor of said at least one of said primary display and said secondary display; and dynamically adjusting said luminance settings of said at least one of said primary display and said secondary display at said at least one of said primary display and said secondary display using said processor of said at least one of said primary display and said secondary display, said processor being configured to dynamically adjust said luminance settings based on said adjustment of luminance settings calculated for said at least one of said primary display and said secondary display, said luminance settings being separate from image data displayed by said at least one of said primary display and said secondary display wherein said adjustment of luminance settings is based at least in part on input from a light sensor.

2. The method of claim 1, further comprising, if said adjustment of luminance settings is not substantially a good fit for rendering, approximating a best rendering settings for said at least one of said primary display and said secondary display.

3. The method of claim 2, further comprising communicating said approximate best rendering settings as said adjustment of luminance settings to said at least one of said primary display and said secondary display.

4. The method of claim 1, wherein said image data includes at least one of high dynamic range (HDR) image/video data, extended dynamic range (EDR) image/video data, visual dynamic range (VDR) image/video data and low dynamic range (LDR) image/video data.

5. The method of claim 1, wherein the steps of establishing communications with said primary display and establishing communications with said secondary display comprise establishing communications between said primary display and said secondary display.

6. The method of claim 1, further comprising dynamically adjusting color gamut settings of at least one of said primary display and said secondary display.

7. A system for perceptually synchronizing a secondary display with a primary display, said secondary display and said primary display within a same visual environment and such that said secondary display is rendering image data substantially at the same time as said primary display, said system comprising: computer readable storage for storing computer readable instructions; and a processor configured to execute said computer readable instructions; and wherein said primary display includes a processor operative to adjust luminance settings of said primary display and to render image data on said primary display; said secondary display includes a processor operative to adjust luminance settings of said secondary display and to render image data on said secondary display; said computer readable instructions comprise a display management module, said display management module capable of receiving metadata identifying one or more capabilities of said primary display and metadata identifying one or more capabilities of said secondary display; said display management module is capable of dynamically calculating an adjustment of luminance settings for at least one of said primary display and said secondary display based on at least one of said capabilities of said primary display and said capabilities of said secondary display indicated by said metadata; and said display management module is further capable of providing said adjustment of luminance settings calculated for said at least one of said primary display and said secondary display to said processor of said at least one of said primary display and said secondary display to facilitate dynamically adjusting the luminance settings of said at least one of said primary display and said secondary display at said at least one of said primary display and said secondary display using said processor of said at least one of said primary display and said secondary display, said processor being configured to dynamically adjust said luminance settings based on said adjustment of luminance settings calculated for said at least one of said primary display and said secondary display, said luminance settings being separate from image data displayed by said at least one of said primary display and said secondary display; wherein said adjustment of luminance settings is based at least in part on input from a light sensor.

8. The system of claim 7, wherein said display management module resides in said primary display.

9. The system of claim 7, wherein said display management module resides in said secondary display.

10. The system of claim 7, wherein said display management module resides in a set top box, a game console, a computer, an audio-video receiver (AVR), a video processor, or a BluRay player.

11. The system of claim 7, wherein said display management module is capable of approximating a best rendering settings for said at least one of said primary display and said secondary display, if said adjustment of luminance settings is not substantially a good fit for rendering.

12. The system of claim 7, wherein said display management module is further capable of dynamically adjusting color gamut settings of at least one of said primary display and said secondary display.

13. The method of claim 1, wherein said step of dynamically adjusting the luminance settings of said at least one of said primary display and said secondary display includes dynamically adjusting at least one of the minimum luminance and maximum luminance settings of said at least one of said primary display and said secondary display.

14. The method of claim 1, wherein said steps of dynamically calculating said adjustment of luminance settings for said at least one of said primary display and said secondary display and dynamically adjusting the luminance settings of said at least one of said primary display and said secondary display occur on a scene-by-scene basis.

15. The method of claim 1, wherein said step of dynamically adjusting the luminance settings of said at least one of said primary display and said secondary display comprises dynamically adjusting the luminance settings of said primary display.

16. The method of claim 1, wherein said step of dynamically adjusting the luminance settings of said at least one of said primary display and said secondary display comprises dynamically adjusting the luminance settings of both said primary display and said secondary display.

17. The method of claim 1, further comprising:
establishing communications with an environmental sensor within said visual environment; and
receiving environmental data from said environmental sensor; and wherein
said step of calculating said adjustment of luminance settings includes calculating said adjustment of luminance settings based on said environmental data.

18. The method of claim 17, further comprising controlling ambient lighting of said visual environment based on said environmental data, said environmental data including data indicative of ambient lighting conditions in said visual environment.

19. The method of claim 1, further comprising:
establishing communications with each of a plurality of secondary displays;
inputting metadata identifying one or more capabilities of each of said plurality of secondary displays;
dynamically calculating an adjustment of luminance settings for each of said plurality of secondary displays based on said capabilities of each of said secondary displays indicated by said metadata; and
providing an associated one of said adjustments of luminance settings to each of said secondary displays to facilitate adjustment of luminance settings of each of said secondary displays at each of said secondary displays.

20. The method of claim 1, wherein said secondary display renders substantially different image data than said primary display.

21. The method of claim 1, wherein said luminance settings are selected from the group consisting of luminance, average luminance, minimum luminance, mean luminance, maximum luminance, and dynamic range.

22. The method of claim 1, further comprising:
dynamically calculating an adjustment of color gamut settings for at least one of said primary display and said secondary display based on at least one of said capabilities of said primary display and said capabilities of said secondary display indicated by said metadata; and
dynamically adjusting said color gamut settings of said at least one of said primary display and said secondary display based on said adjustment of color gamut settings calculated for said at least one of said primary display and said secondary display, said color gamut settings being separate from said image data displayed by said at least one of said primary display and said secondary display.

23. The method of claim 1, wherein:
said metadata received from said secondary display is further indicative of a distance between said primary display and said secondary display; and
said step of dynamically calculating said adjustment of luminance settings for said at least one of said primary display and said secondary display is based on said distance.

24. A method for perceptually synchronizing a secondary display with a primary display, said secondary display and said primary display within a same visual environment and such that said secondary display rendering image data at substantially the same time as said primary display, the steps of said method comprising: establishing communications with said primary display, said primary display including a processor operative to adjust luminance settings of said primary display and to render image data on said primary display; establishing communications with said secondary display, said secondary display including a processor operative to adjust luminance settings of said secondary display and to render image data on said secondary display; receiving metadata from said primary display and said secondary display, said metadata specifying image-rendering parameters of said primary display and image-rendering parameters of said secondary display, respectively, said image-rendering parameters of least one of said primary display and said secondary display including luminance parameters; dynamically calculating an adjustment of luminance settings for at least one of said primary display and said secondary display based on at least one of said image-rendering parameters of said primary display and said image-rendering parameters of said secondary display specified by said metadata; providing said adjustment of luminance settings calculated for said at least one of said primary display and said secondary display to said processor of said at least one of said primary display and said secondary display; and dynamically adjusting said luminance settings of said at least one of said primary display and said secondary display at said at least one of said primary display and said secondary display using said processor of said at least one of said primary display and said secondary display, said processor being configured to dynamically adjust said luminance settings based on said adjustment of luminance settings calculated for said at least one of said primary display and said secondary display, said luminance settings being separate from image data displayed by said at least one of said primary display and said secondary display; wherein said adjustment of luminance settings is based at least in part on input from a light sensor.

25. A method for perceptually synchronizing a secondary display with a primary display, said secondary display and said primary display within a same visual environment and such that said secondary display rendering image data at substantially the same time as said primary display, the steps of said method comprising: establishing communications with said primary display, said primary display including a processor operative to adjust luminance settings of said primary display and to render image data on said primary display; establishing communications with said secondary display, said secondary display including a processor operative to adjust luminance settings of said secondary display and to render image data on said secondary display; receiving primary metadata from said primary display and secondary metadata from said secondary display, said primary metadata providing information about luminance capabilities of said primary display and said secondary metadata providing information about luminance capabilities of said secondary display that can be dynamically adjusted; dynamically calculating an adjustment of luminance settings for said secondary display based on said primary metadata and said secondary metadata; providing said adjustment of luminance settings to said processor of said secondary display; and dynamically adjusting the luminance settings of said secondary display at said secondary display using said processor of said secondary display, said processor being configured to dynamically adjust said luminance settings of said secondary display based on said calculated adjustment of luminance settings, wherein said luminance settings are global settings separate from displayed image data values; wherein said adjustment of luminance settings is based at least in part on input from a light sensor.

26. The method of claim 1, wherein:
one of said primary display and said secondary display is a movie theatre display; and
the other of said primary display and said secondary display is a hand-held device located in said movie theatre.

27. The method of claim 1, wherein:
one of said primary display and said secondary display is a television set; and
the other of said primary display and said secondary display is a hand-held device within viewing distance of the television set.

28. The method of claim 27, wherein said method is implemented at least partially within a set-top box coupled to said television set.

* * * * *